US012573824B2

(12) United States Patent
Kolling et al.

(10) Patent No.: US 12,573,824 B2
(45) Date of Patent: Mar. 10, 2026

(54) ELECTRICAL DISTRIBUTION BOX

(71) Applicant: Trystar, LLC, Faribault, MN (US)

(72) Inventors: Natalie Kolling, Faribault, MN (US);
Meghan Flaherty, Mankato, MN (US)

(73) Assignee: TRYSTAR, LLC, Faribault, MN (US)

( * ) Notice: Subject to any disclaimer, the term of this
patent is extended or adjusted under 35
U.S.C. 154(b) by 608 days.

(21) Appl. No.: 17/967,317

(22) Filed: Oct. 17, 2022

(65) Prior Publication Data

US 2024/0128728 A1 Apr. 18, 2024

(51) Int. Cl.
*H02G 3/08* (2006.01)

(52) U.S. Cl.
CPC ............. *H02G 3/081* (2013.01); *H02G 3/088*
(2013.01)

(58) Field of Classification Search
CPC .... H02G 3/081; H02G 3/088; B65D 21/0209;
B65D 21/0217; B65D 21/0219; B65D
21/0222; B65D 21/0223
USPC ..... 220/4.02, 3.2, 4.26, 4.01, 4.27; 206/349,
206/510
See application file for complete search history.

(56) References Cited

U.S. PATENT DOCUMENTS

| | | | |
|---|---|---|---|
| 936,451 A | 10/1909 | Havenhill | |
| 2,956,705 A | 10/1960 | Clingman | |
| 3,380,768 A | 4/1968 | Wolfensberger | |
| 3,751,127 A | 8/1973 | Pospisil et al. | |
| 3,901,571 A | 8/1975 | Begitschke et al. | |
| 3,955,702 A | 5/1976 | Lundy | |
| 4,115,655 A | 9/1978 | Prentice | |
| 4,123,129 A | 10/1978 | Butler | |
| 4,126,364 A | 11/1978 | Reilly | |
| 4,322,572 A | 3/1982 | Snyder | |
| 4,637,324 A | 1/1987 | Janson | |
| 4,768,845 A | 9/1988 | Yeh | |
| 4,846,078 A | 7/1989 | Janson | |
| 4,869,380 A | 9/1989 | Metcalfe et al. | |
| 4,884,715 A | 12/1989 | Pohlmann | |

(Continued)

FOREIGN PATENT DOCUMENTS

| | | | | |
|---|---|---|---|---|
| DE | 7922747 U1 | 12/1979 | | |
| DE | 102008061908 B3 | 7/2010 | | |
| EP | 0024502 A1 * | 3/1981 | ............... | G21F 5/12 |

OTHER PUBLICATIONS

International Searching Authority, "International Search Report and
Written Opinion", for Application No. PCT/US2023/076937, mailed
Feb. 13, 2024, pp. 1-17.

*Primary Examiner* — Rafael A Ortiz
(74) *Attorney, Agent, or Firm* — Fredrikson & Byron,
P.A.

(57) ABSTRACT

Example electrical boxes include a lid, a base, and side
walls. The lid includes a lid structure comprising a lid upper
surface structure and a lid lower surface structure. The base
includes a base structure comprising a base upper surface
structure and a base lower surface structure. The side walls
extend between the lid and the base, forming an interior
configured to house electrical components. The lid upper
surface structure can mate with a lower surface structure of
a higher electrical box in a stack. The base lower surface
structure can mate with an upper surface structure of a lower
electrical box in a stack. The lid upper surface structure can
be identical to the base upper surface structure of a lower
electrical box. The lid lower surface structure can be iden-
tical to the base lower surface structure of a higher electrical
box.

20 Claims, 10 Drawing Sheets

(56) References Cited

U.S. PATENT DOCUMENTS

| | | | |
|---|---|---|---|
| 4,997,240 A | 3/1991 | Schmalzl et al. | |
| 5,070,429 A | 12/1991 | Skirpan | |
| D323,809 S | 2/1992 | Ross, Jr. | |
| 5,202,538 A | 4/1993 | Skirpan | |
| D340,040 S | 10/1993 | Gifford et al. | |
| 5,470,139 A | 11/1995 | Hsiao | |
| 5,544,003 A | 8/1996 | Vaughan | |
| 6,062,664 A | 5/2000 | Benner | |
| 6,768,054 B2 * | 7/2004 | Sato | H02G 3/088 |
| | | | 174/53 |
| D498,211 S | 11/2004 | Thibault | |
| 6,832,580 B2 | 12/2004 | Marchioro | |
| D503,377 S | 3/2005 | Krieger et al. | |
| D542,284 S | 5/2007 | Kim | |
| 7,528,322 B1 * | 5/2009 | Gretz | H02G 3/121 |
| | | | 174/53 |
| 7,848,085 B2 | 12/2010 | Gerber | |
| 7,922,417 B2 | 4/2011 | Jimenez | |
| 8,053,671 B1 * | 11/2011 | Shotey | H02G 3/14 |
| | | | 174/67 |
| 8,395,883 B2 | 3/2013 | Takata et al. | |
| 8,403,431 B2 | 3/2013 | Elkins et al. | |
| D682,218 S | 5/2013 | Takata et al. | |
| D689,024 S | 9/2013 | Takata et al. | |
| 8,616,661 B2 | 12/2013 | Takata et al. | |
| 2002/0070043 A1 * | 6/2002 | Kitajima | H02G 3/088 |
| | | | 174/50 |
| 2007/0210087 A1 * | 9/2007 | McCormick | H02G 3/088 |
| | | | 220/484 |
| 2008/0290771 A1 | 11/2008 | Jimenez | |
| 2010/0270299 A1 | 10/2010 | Baltussen et al. | |
| 2011/0163648 A1 | 7/2011 | Jimenez | |
| 2017/0129096 A1 * | 5/2017 | Chen | B25H 3/02 |

* cited by examiner

ELECTRICAL DISTRIBUTION BOX

TECHNICAL FIELD

The disclosure relates to electrical distribution boxes.

BACKGROUND

Electrical distribution boxes are used to distribute electrical power to locations where sufficient electrical power infrastructure is unavailable yet where various devices must access electrical power. Cables can extend from a utility power supply or a portable generator to an electrical distribution box. The electrical distribution box has one or more connecting interfaces (e.g., sockets). Examples of devices that can be plugged into an electrical distribution box include power tools at a construction site, sound and light equipment at a concert, displays at trade shows, and so on. The interior of an electrical distribution box houses electrical components, such as circuit breakers, neutral and ground bars, connecting wires, etc. Some electrical distribution boxes are designed to be used in a wide range of environmental conditions, so durability and weather resistance are important attributes for such electrical distribution boxes.

SUMMARY

This disclosure in general describes electrical distribution box embodiments and related methods. In particular, embodiments disclosed herein can facilitate the storage and transportation of electrical boxes using lid and base structures.

In one embodiment of the present disclosure, an electrical distribution box is disclosed. The electrical distribution box can comprise a lid that includes a lid structure comprising a lid upper surface structure and a lid lower surface structure. The electrical distribution box can also comprise a base that includes a base structure comprising a base upper surface structure and a base lower surface structure. Further, the electrical distribution box can comprise side walls extending between the lid and the base to form an interior configured to house one or more electrical components. The lid upper surface structure of the electrical distribution box can be configured to mate with a lower surface structure of a higher electrical box in a stack, and the base lower surface structure of the electrical distribution box can be configured to mate with an upper surface structure of a lower electrical box in a stack. Additionally, the lid upper surface structure can be identical to the base upper surface structure and to the upper surface structure of the lower electrical box in the stack. Furthermore, the lid lower surface structure is identical to the base lower surface structure and to the lower surface structure of the higher electrical box in the stack.

In another embodiment of the present disclosure, a method for stacking electrical distribution boxes is disclosed. The method can include stacking a second electrical box on top of a first electrical box with the first electrical box including a first lid that includes a first lid structure comprising a first lid upper surface structure and a first lid lower surface structure. The first electrical box also includes a first base that includes a first base structure comprising a first base upper surface structure and a first base lower surface structure. The first base further includes first side walls extending between the first lid and the first base to form a first interior that houses a first set of electrical components. The second electrical box includes a second lid that includes a second lid structure comprising a second lid upper surface structure and a second lid lower surface structure. The second electrical box also includes a second base that includes a second base structure comprising a second base upper surface structure and a second base lower surface structure. The second electrical further includes second side walls extending between the second lid and the second base to form a second interior that houses a second set of electrical components. The first upper surface structure can mate with the second base lower surface structure and the first base upper surface structure, the first lid upper surface structure, the second base upper surface structure, and the second lid upper surface structure can be identical to one another. Additionally, the first base lower surface structure, the first lid lower surface structure, the second base lower surface structure, and the second lid lower surface structure can be identical to one another.

In another embodiment of the present disclosure, an electrical box group is disclosed. The electrical box group can include a bulk container that includes a platform and six stacks of electrical boxes positioned in two rows of three on the platform. Each electrical box in each of the six stacks of electrical boxes can include (a) a lid that includes lid structure comprising a lid upper surface structure and a lid lower surface structure, (b) a base that includes a base structure comprising a base upper surface structure that is identical to the lid upper surface structure and a base lower surface structure that is identical to the lid lower surface structure, and (c) side walls extending between the lid and the base to form an interior that houses one or more electrical components. In each of the six stacks of electrical boxes, an upper electrical box, an upper electrical box being stacked on top of a lower electrical box comprises the base lower surface structure of the upper electrical box mating with the lid upper surface structure of the lower electrical box.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
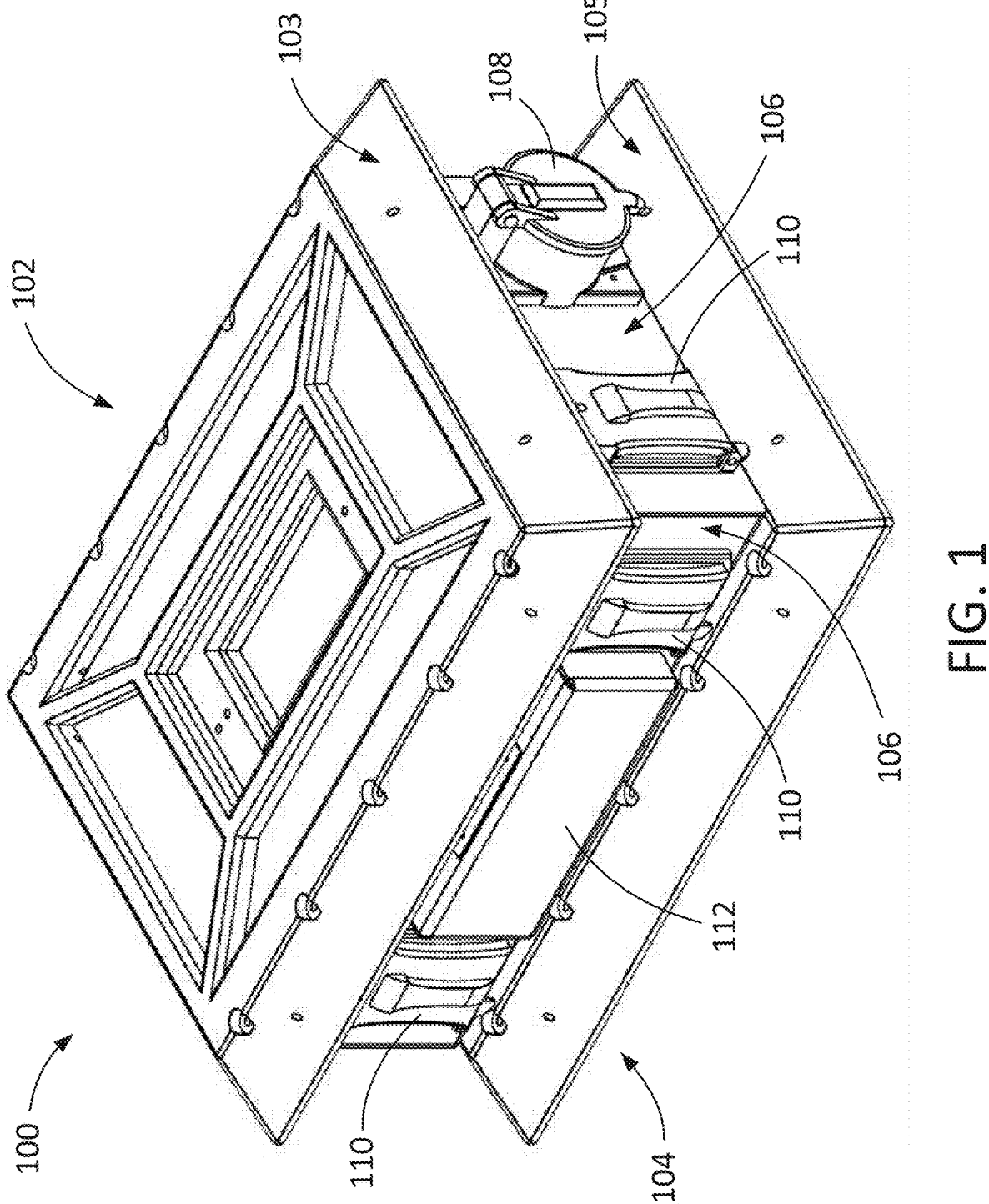
FIG. 1 is a perspective view of an example electrical distribution box according to an aspect of the present disclosure.

FIG. 1 is a perspective view of an example electrical distribution box 100 according to an aspect of the present disclosure. The electrical distribution box 100 (also referred to as "electrical box") includes a lid 102 which includes a lid structure 103 and a base 104 with a base structure 105. The electrical box also includes side walls 106 extending between and connecting the lid 102 and the base 104. Various electrical connectors 108, 110, 112 are embedded in the side walls 106 and enable the electrical box 100 to receive electrical power from a source (e.g., a portable generator or utility power source) and to supply electrical power to various devices that are connected to the electrical box 100.

In the illustrated example, the various connectors 108, 110, 112 each include a weatherproof cover that can help protect the connector when it is not in use and optionally, when the connector is in use. The electrical connectors 108, 110, 112 can be any type of electrical connector and can include different styles of NEMA electrical connectors.

Figure 2:
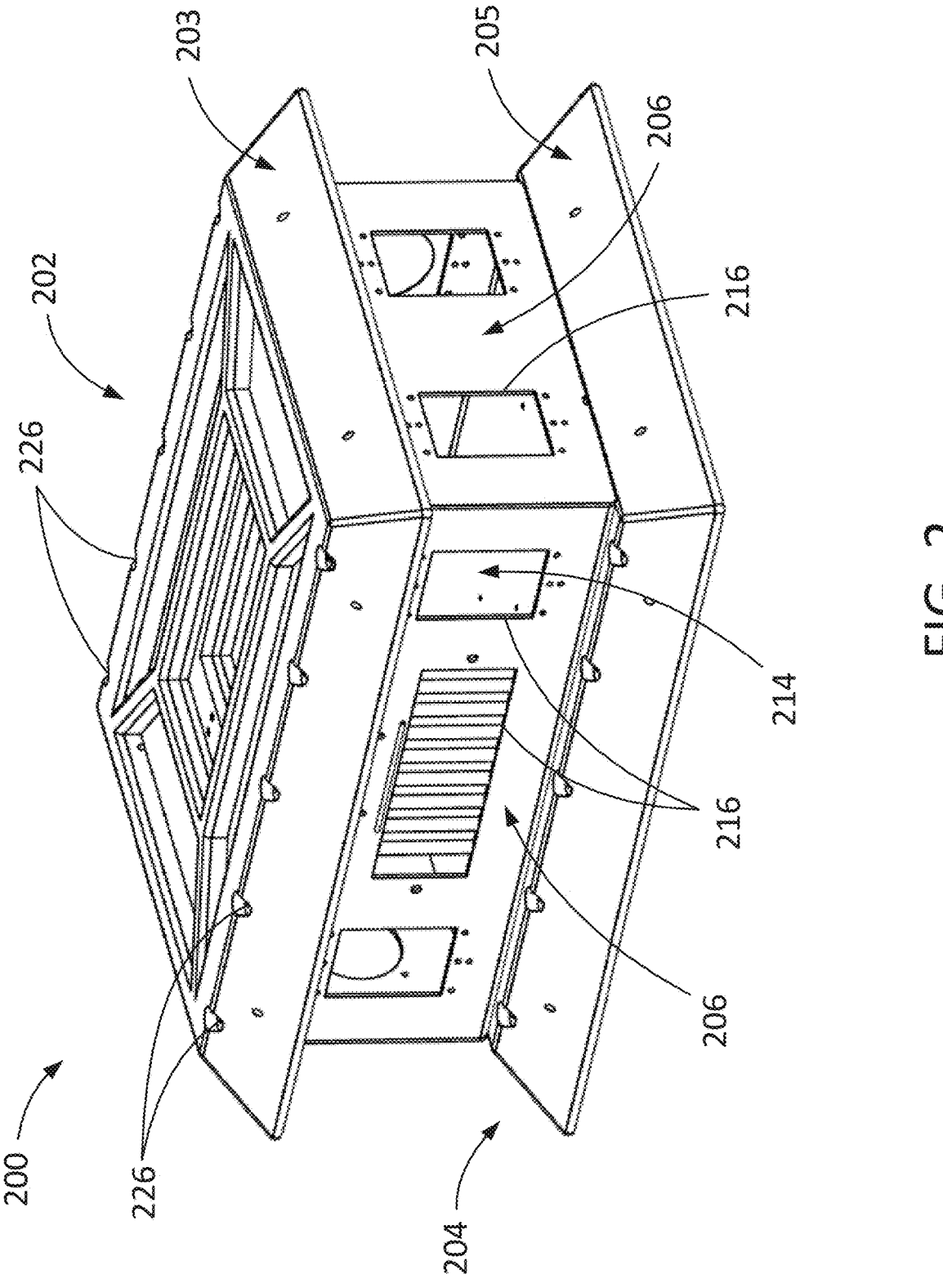
FIG. 2 is a perspective view of an example electrical distribution box with electrical connectors removed according to an aspect of the present disclosure.

FIG. 2 is a perspective view of an example electrical distribution box 200 with electrical connectors (e.g., 108, 110, 112) removed according to an aspect of the present disclosure. The electrical box 200 includes a lid 202 with a lid structure 203 and a base 204 with a base structure 205. Side walls 206 extend between and connect the lid 202 with the base 204, defining an interior 214, which can house one or more electrical components. The lid 202 can be connected to the side walls 206 via a series of fasteners (e.g., screws) which are secured through holes 226, defined by the lid structure 203, and into folded portions of the side walls. In some examples, the base 204 can be secured to the side walls 206 in a similar manner, but in the example of FIG. 2, fasteners are secured through holes located in the interior 214 and into the base 204.

The side walls 206 include cutouts 216 which can take various shapes. For example, the cutouts 216 can be sized specifically to fit various electrical connectors (e.g., 108, 110, 112) including NEMA electrical connectors. Any number of cutouts can be included in the side walls. In some examples, one or more cutouts 216 can be used for cooling purposes such as for a heatsink.

Figure 3A:
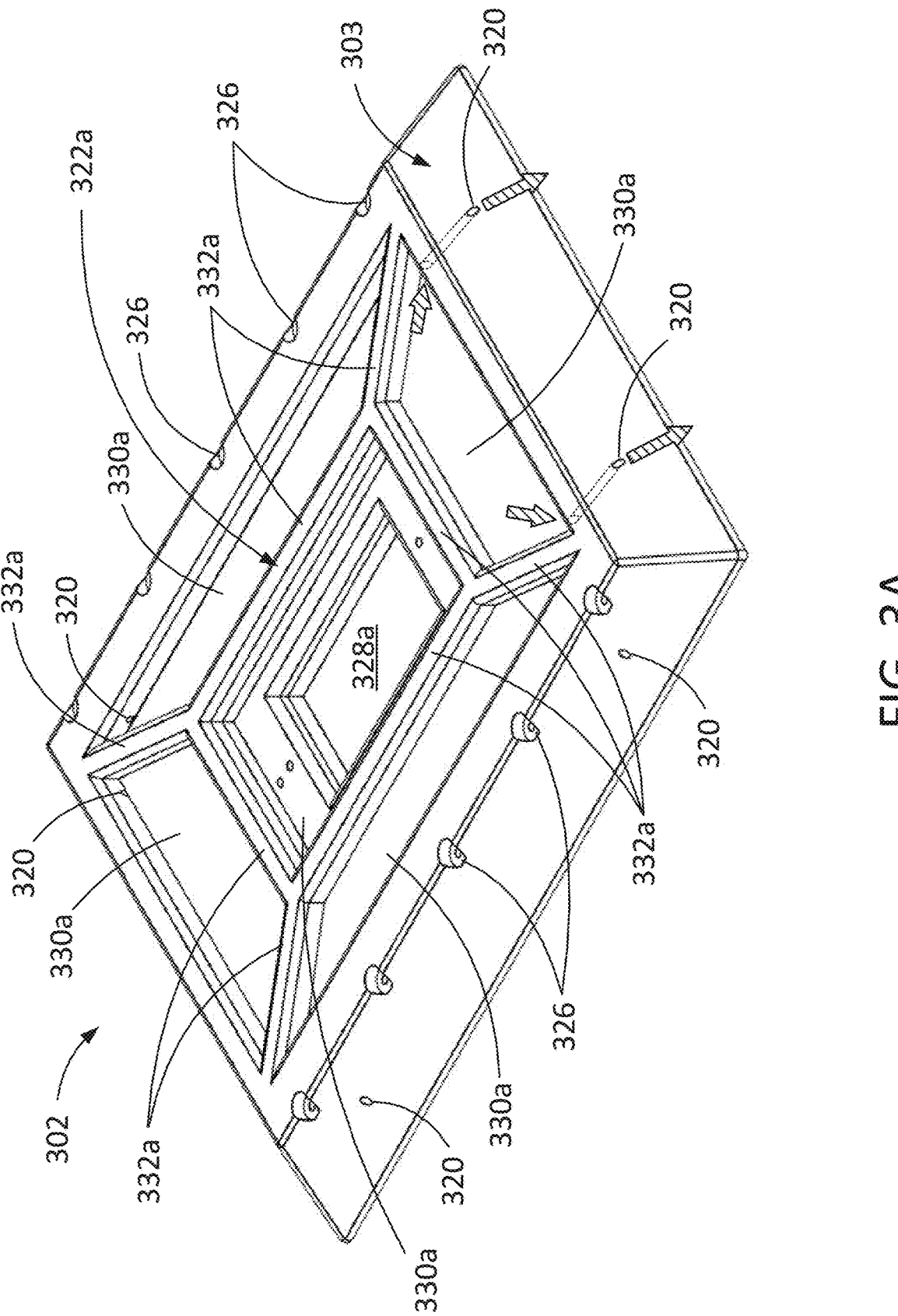
FIG. 3A is a perspective top view of a lid or base structure of an example electrical distribution box according to an aspect of the present disclosure.
Figure 3B:
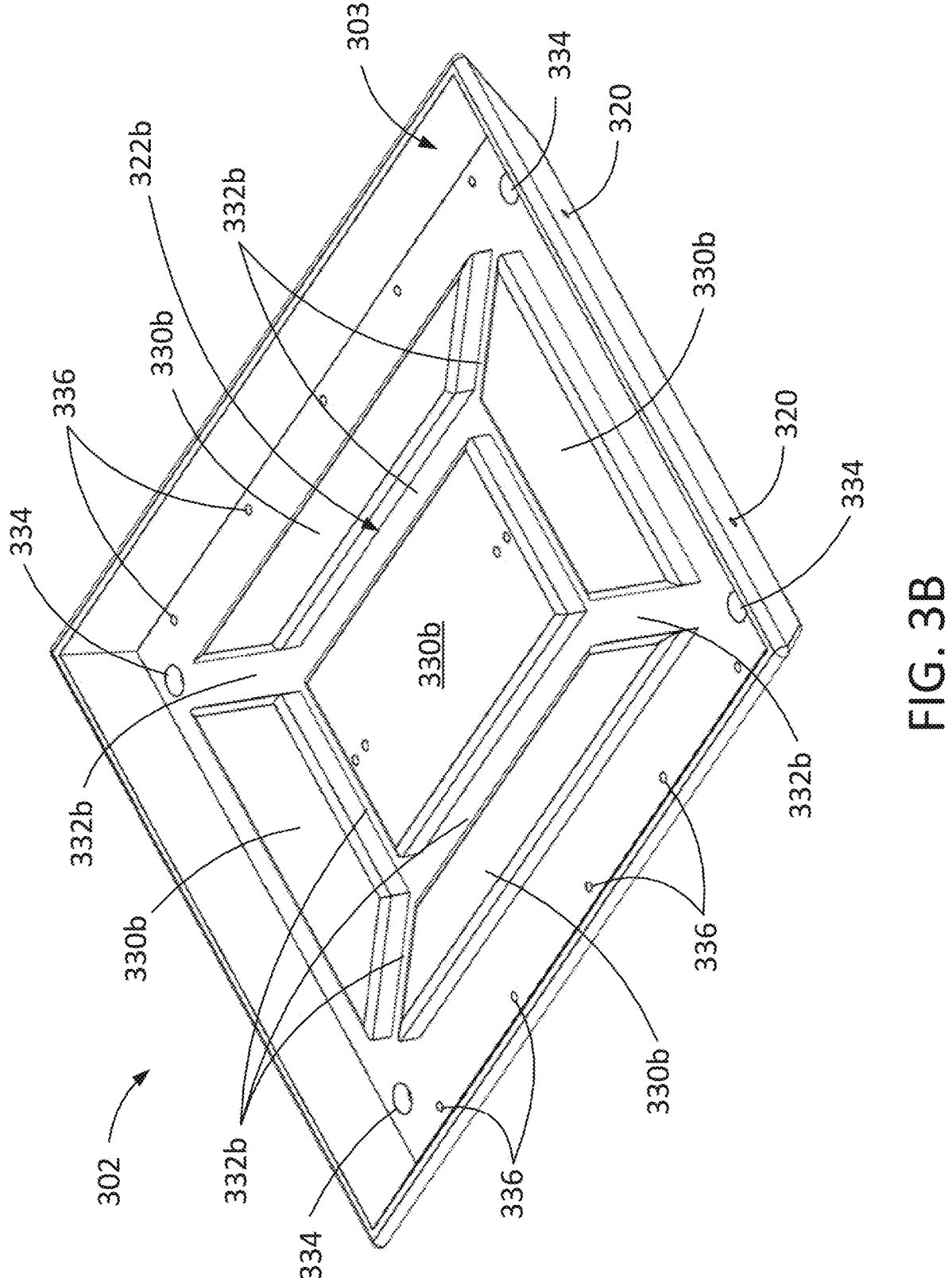
FIG. 3B is a perspective bottom view of the lid or base structure of the example electrical distribution box of FIG. 3A according to an aspect of the present disclosure.

FIG. 3A is a perspective top view of a lid or base 302 of an example electrical distribution box according to an aspect of the present disclosure, while FIG. 3B is a perspective bottom view of the lid or base 302 of FIG. 3A. Referring first to both FIGS. 3A and 3B, the illustrated component can be a lid (e.g., 202) or a base (e.g., 204). The lid or base 302 includes a lid or base structure 303, which comprises a lid or base upper surface structure 322a and a lid or base lower surface structure 322b. The lid or base upper surface structure 322a includes raised portions 332a and recessed portions 330a, which in some examples, can be horizontally symmetrical. In the center of the lid or base upper surface structure 322a, the lid or base 302 includes a depression 328 which is further recessed than the recessed portions 330a. The lid or base lower surface structure 322b includes recessed portions 332b and raised portions 330b, which in some examples, can be horizontally symmetrical.

The raised portions 332a and the recessed portions 330a of the upper surface structure 322a in FIG. 3A are complementary to the recessed portions 332b and the raised portions 330b of the lower surface structure 322b in FIG. 3B. The complementary raised/recessed portions are configured to mate with one another such that one can be secured to the other. For instance, in some examples, the upper surface structure 322a is configured to mate with the lower surface structure 322b. In such examples, the raised portions 332a of the upper surface structure 322a mate with the recessed portions 332b of the lower surface structure 322b and the recessed portions 330a of the upper surface structure 322a mate with the raised portions 330b of the lower surface structure 322b. In some examples, the raised and recessed portions are rounded or filleted along their edges which can aid in mating, removal, and durability.

Further in FIG. 3A and FIG. 3B, the lid or base 302 defines a series of holes 326 which run through the lid or base 302 forming exit holes 336 on the underside of the lid or base 302. The series of holes 326 and exit holes 336 can be used with fasteners to secure the lid or base to side walls as in FIG. 1 and FIG. 2. In some examples, the series of holes 326 and exit holes 336 are used to secure a lid, but not a base, to side walls of an electrical box. In some such examples, the base can be secured to side walls of the electrical box using fasteners which pass through the holes 334 located on the underside of the base and then through the top of the base. Other methods and structures can be used to secure the lid and base to the side walls of the electrical box, and a person having ordinary skill will understand this disclosure is not limited to fasteners.

Additionally, in FIG. 3A and FIG. 3B, the lid or base 302 defines holes 320 which can be used for draining liquids (e.g., water) from the recessed portions 330a of the lid or base. In the illustrated embodiment, two holes 320 are provided per recessed portion 330a except for the most central recessed portion. Each of the holes 320 pass through from an interior of a recessed portion 330a to the exterior of the lid or base structure 303. For example, as shown by the shaded arrows and dashed lines in FIG. 3A, liquid can flow from the recessed portion 330a, through the holes 320, and outward onto the lid or base structure 303. In some examples, the holes 320 are sloped downwardly to enable liquids to flow more easily. The exterior of the lid or base structure can be downward sloping toward its edges. Because of this downward slope, any liquid that flows outward onto the lid or base structure from the holes 320, or liquid that hits the downward slope, will be directed away from the electrical box. The holes 320, in addition to the one or more sloped surfaces of the lid or base structure 303, can prevent water or other liquids from filling up the recessed portions 330*a* and can help weatherproof the electrical box.

In similarity with the lid or base structure 303, the recessed portions 330*a* of the lid or base upper surface structure 322*a* are not level but can slope downward from the center of the lid or base 302. In some examples, the slope is both downward from the center of the lid or base 302 and outward toward the corners of the lid or base 302. The sloped recessed portions can prevent water or other liquids from accumulating in the recessed portions 330*a* more effectively than non-sloped recessed portions, though non-sloped recessed portions are contemplated.

Figures 4A, 4B:
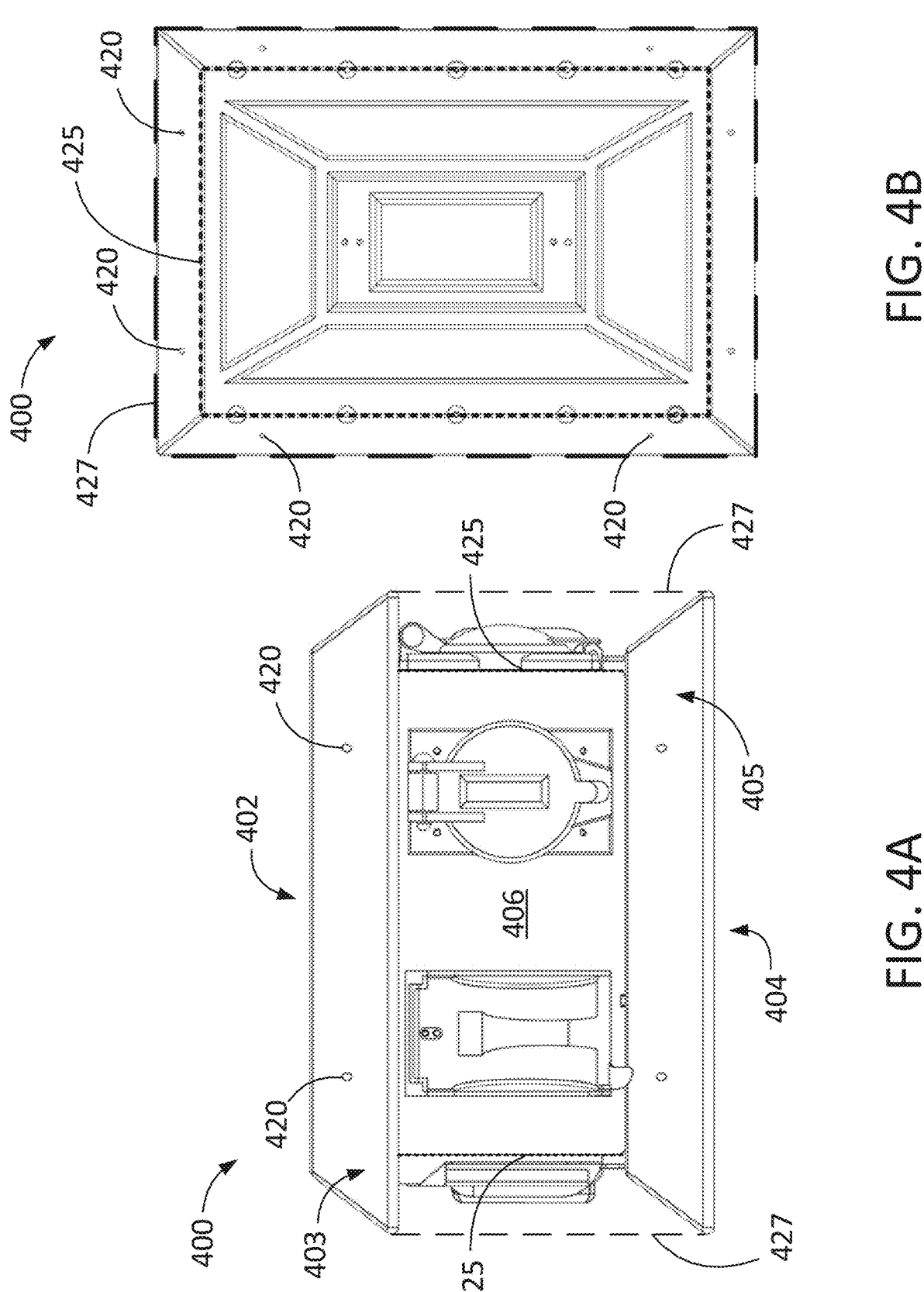
FIG. 4A is a side view of an example electrical distribution box according to an aspect of the present disclosure.
FIG. 4B is a top-down view of the example electrical distribution box of FIG. 4A according to an aspect of the present disclosure.

Moving to FIG. 4A and FIG. 4B, FIG. 4A is a side view of an example electrical distribution box 400 according to an aspect of the present disclosure, while FIG. 4B is a top-down view of the example electrical distribution box 400 of FIG. 4A. The electrical box 400 includes a lid 402 with a lid structure 403 and a base 404 with a base structure 405. Side walls 406 connect the lid 402 with the base 404. The lid structure 403 includes holes 420 which can be configured to drain liquids from recessed portions to the outside surfaces of the lid structure 403 (e.g., as shown in FIG. 3A). The lid structure 403, as well as the base structure 405, have surfaces which slope downward toward the edges of the lid 402 and base 404 respectively. The lid structure creates an overhang over the side walls 406 that extends beyond the side walls 406 and in some examples, extends beyond any electrical connector covers.

As illustrated in both FIG. 4A and FIG. 4B, the side walls 406 of the electrical box 400 can form a side wall perimeter 425 while the lid 402 has a lid perimeter 427. The lid perimeter 427 extends horizontally beyond the side wall perimeter 425, thereby creating an overhang over the side walls 406. This overhang can act as a roof, preventing liquids from falling on or running down the side walls 406. As discussed elsewhere herein, liquids can drain from the holes 420 which surround the lid 402. Subsequently, the liquids can run off the sloped surfaces of the lid structure 403, which extend beyond the side wall perimeter, ensuring that liquids draining from the holes 420 drain liquid outside the side wall perimeter 425.

Figure 5:
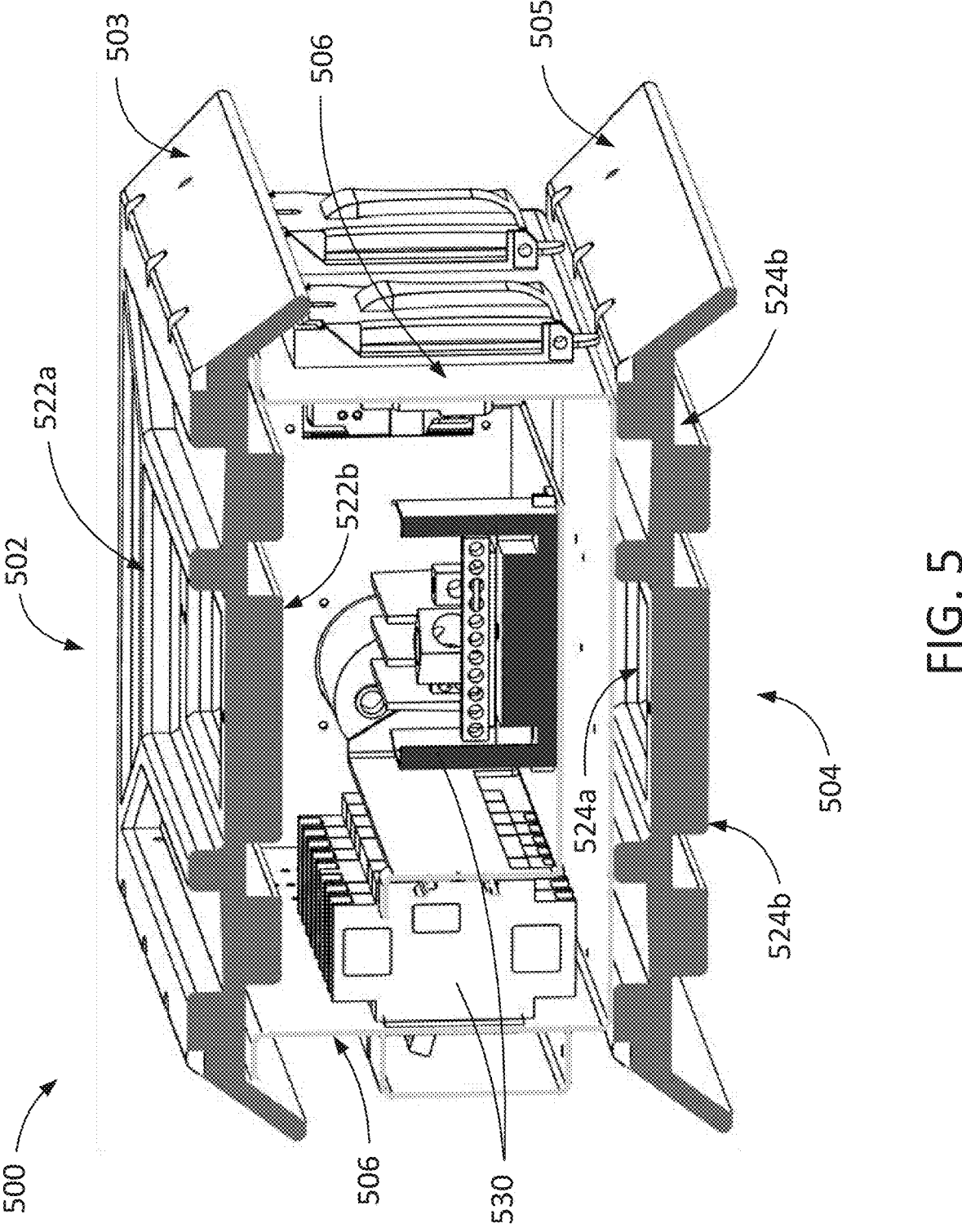
FIG. 5 is a perspective, sectional view of an example electrical distribution box according to an aspect of the present disclosure.

Moving to FIG. 5, FIG. 5 is a perspective, sectional view of an example electrical distribution box 500 according to an aspect of the present disclosure. The electrical box 500 comprises a lid 502 that includes a lid structure 503 comprising a lid upper surface structure 522*a* and a lid lower surface structure 522*b*. The electrical box also comprises a base 504 that includes a base structure 505 comprising a base upper surface structure 524*a* and a base lower surface structure 524*b*. A series of side walls 506 extend between the lid 502 and the base 504 to form an interior configured to house one or more electrical components 530. As illustrated in FIG. 4A, FIG. 4B, and FIG. 5, the lid 502 and base 504 can extend beyond the side walls 506 and the electrical connector covers. In some examples, the lid 502 and the base 504 comprise a rubber material while the side walls comprise sheet metal. Because the lid 502 and base 504 can extend beyond the side walls 506 the lid 502 and base 504 can serve as a bumper for the side walls 506. If the lid 502 and base 504 are made from shock absorbent materials (e.g., rubber material), they can additionally prevent damage from shocks and other disturbances (e.g., dropping the electrical box) to the sidewalls 506 and internal electrical components 530 of the electrical box 500.

Figures 6A, 6B:
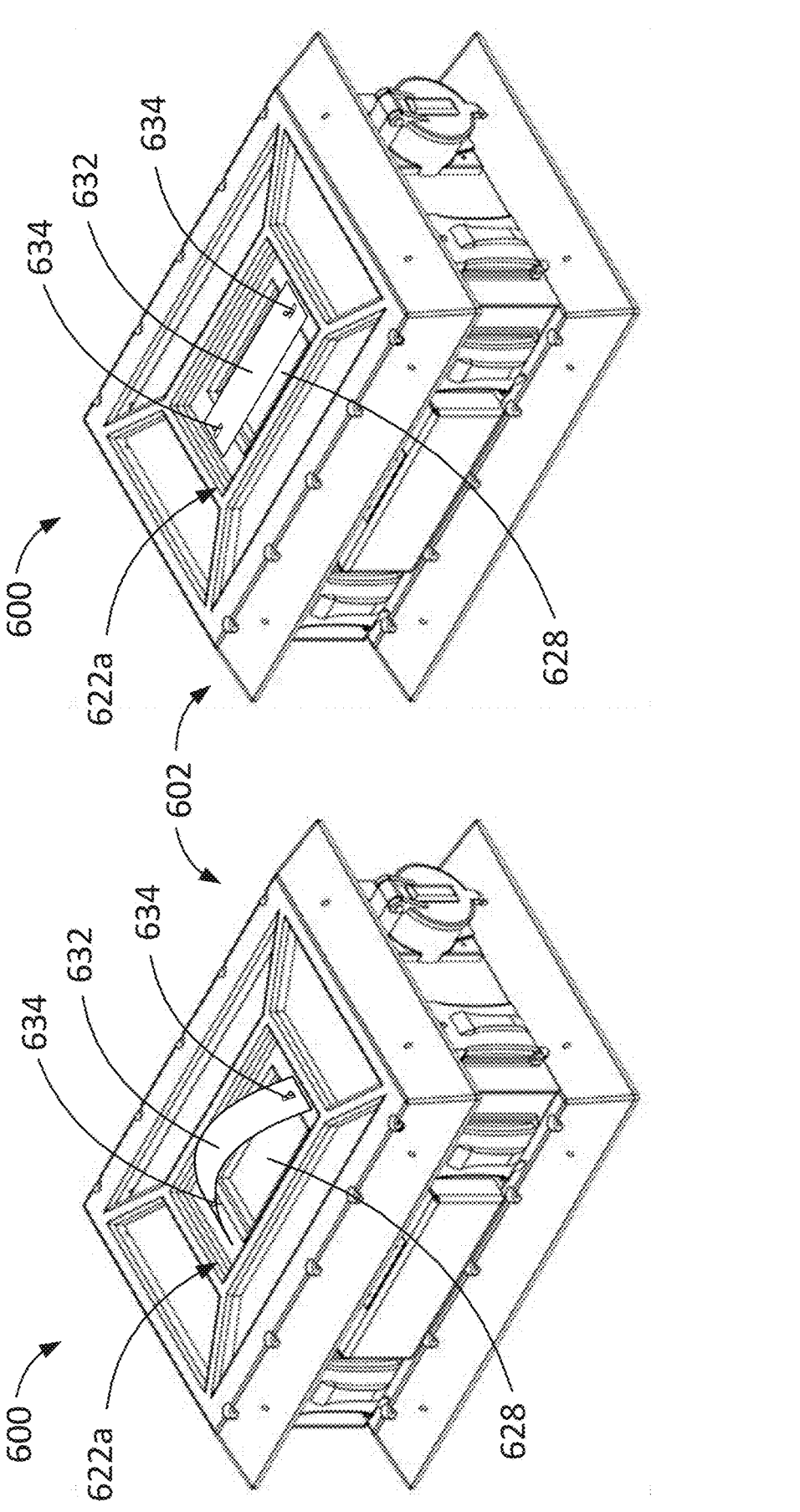
FIG. 6A is a perspective view of an example electrical distribution box with an example extended handle according to an aspect of the present disclosure.
FIG. 6B is a perspective view of the example electrical distribution box of FIG. 6A with the example handle retracted according to an aspect of the present disclosure.

Moving to FIG. 6A and FIG. 6B, FIG. 6A is a perspective view of an example electrical distribution box 600 with an example extended handle 632 according to an aspect of the present disclosure while FIG. 6B is a perspective view of the example electrical distribution box 600 of FIG. 6A with the example handle 632 retracted. The electrical box 600 includes an example handle 632 which is attached to the lid of the electrical box via two connections 634. The connections 634 are connections that enable the handle to extend and retract between a storage position and an operational position. For example, the connections 634 can be a pin in a slot or the like.

The lid 602 of the electrical box includes a lid upper surface structure 622*a* which can include a handle depression 628 located in its center. The handle depression 628 can be sized such that the handle 632 nestles in the handle depression 628 when the handle is in a storage position. However, the configuration of the handle 632 and the handle depression 628 can also enable a user to easily grab and extend the handle to an operational position in which the handle is withdrawn from the handle depression. In some examples, such as the example of FIG. 6A and FIG. 6B, when the handle is in a storage position, the handle does not interfere with stacking and mating. While one example handle is illustrated in FIG. 6A and FIG. 6B, a person of ordinary skill will appreciate that other handle designs, including handle connections, are contemplated and that this disclosure is not limited by the described design.

Figure 7:
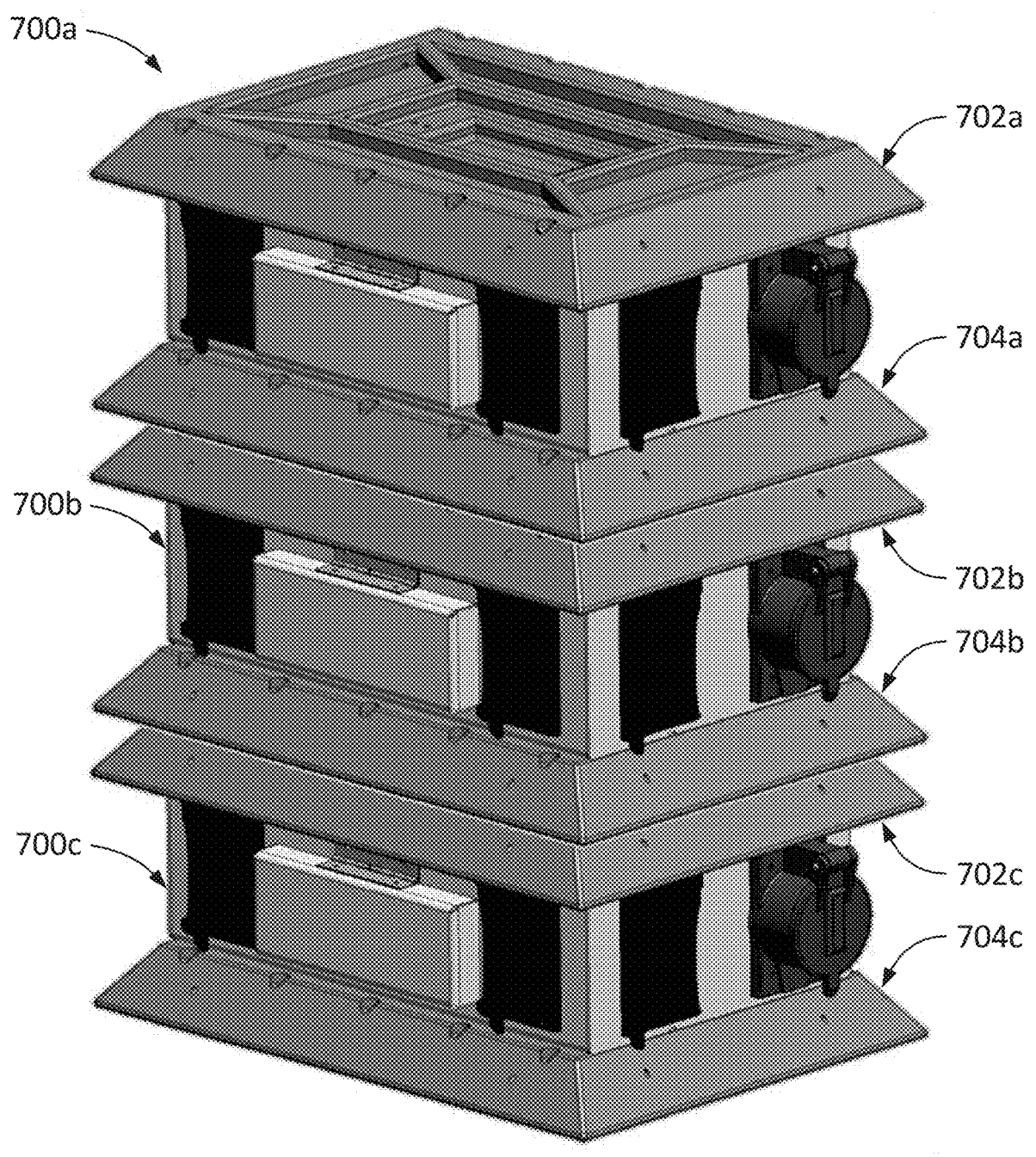
FIG. 7 is a perspective view of a stack of multiple example electrical distribution boxes according to an aspect of the present disclosure.

Moving to FIG. 7, FIG. 7 is a perspective view of a stack of multiple example electrical distribution boxes 700*a*, 700*b*, 700*c* according to an aspect of the present disclosure. Each of the electrical boxes, in similarity with FIG. 5, include a lid with a lid structure comprising a lid upper surface structure (e.g., 722*a*) and lid lower surface structure, a base with a base structure comprising a base upper surface structure and a base lower surface structure, and sidewalls extending between the lid and the base to form an interior configured to house one or more electrical components. As illustrated, a first electrical box 700*a* is stacked atop a second electrical box 700*b* which is stacked atop a third electrical box 700*c*. The base 704*a* of the first electrical box 700*a* is mated with the lid 702*b* of the second electrical box 700*b* and the base 704*b* of the second electrical box 700*b* is mated with the lid 702*c* of the third electrical box 700*c*. In the illustrated example, the lid upper surface structure of the second electrical box 700*b* is configured to mate with the base lower surface structure of the higher electrical box in the stack, i.e., the first electrical box 700*a*. Further, the base surface structure of the second electrical box 700*b* is configured to mate with the lid upper surface structure of the lower electrical box in the stack, i.e., the third electrical box 700*c*.

The electrical boxes can stack, with a base of a higher electrical box in the stack mating with a lid of a lower electrical box in the stack, and a lid of a lower electrical box in the stack mating with the base of a higher electrical box in the stack, in part because their lid structures and base structures are identical. In FIG. 7, for example, the lid upper surface structure of the second electrical box 700*b* is identical to both its own base upper surface structure and to the upper surface structure of the lower electrical box in the stack, the third electrical box 700*c*. Further, the lid lower surface structure of the second electrical box 700*b* is identical both to its own base lower surface structure and to the base lower surface structure of the higher electrical box in the stack, the first electrical box 700a. In such a configuration, the three electrical boxes 700a, 700b, 700c are mated with each other and are securely stacked. While only three electrical boxes are illustrated as stacked, any number of electrical boxes can be stacked in a similar manner as in FIG. 7.

Figure 8:
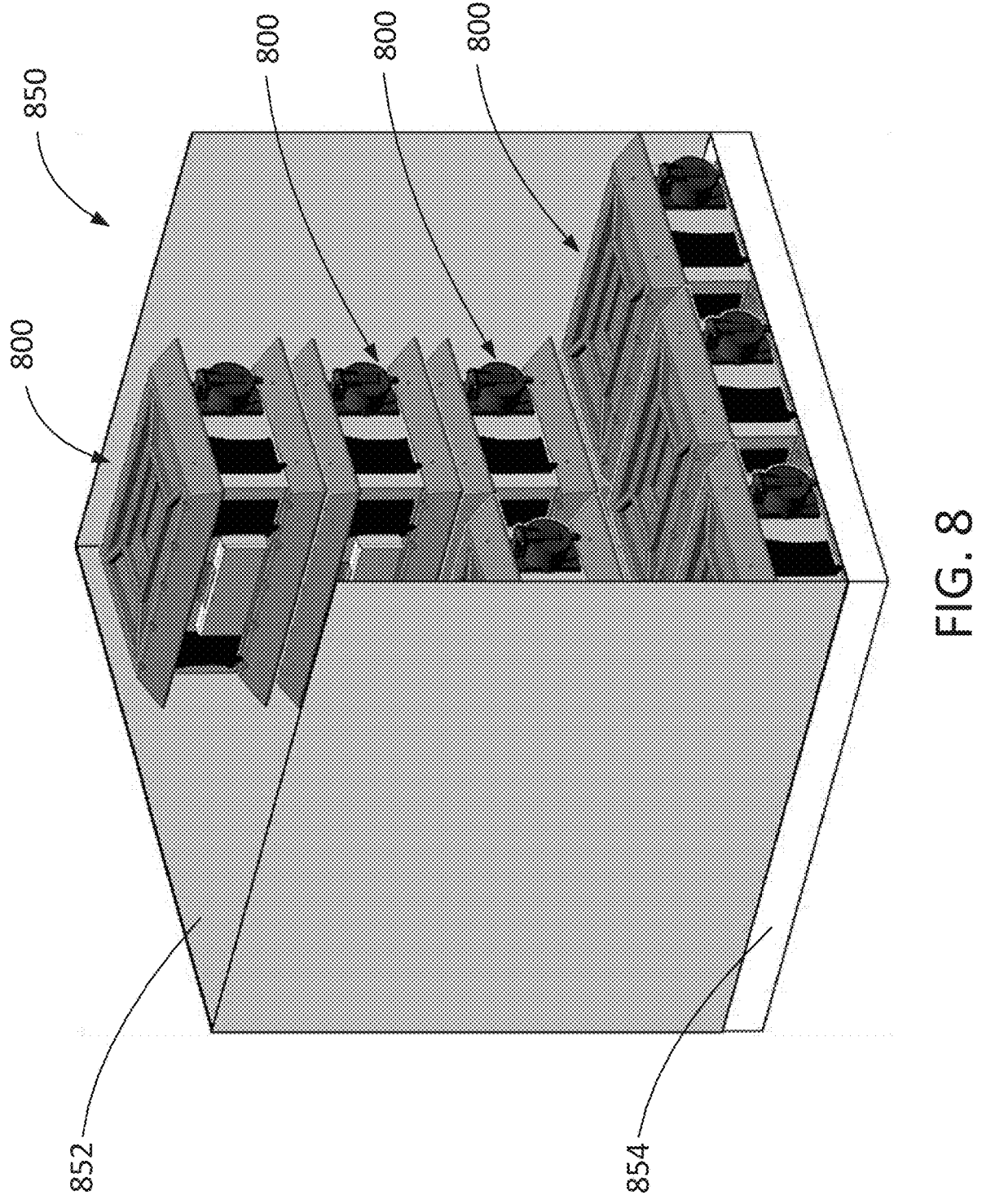
FIG. 8 is a perspective view of an electrical box group containing multiple stacks of example electrical distribution boxes according to an aspect of the present disclosure.

Moving to FIG. 8, FIG. 8 is a perspective view of an electrical box group 850 containing multiple stacks of example electrical distribution boxes 800 according to an aspect of the present disclosure. The electrical box group 850 includes a bulk container 852 that includes a platform 854 which houses the electrical boxes 800. In some examples, the platform 854 is approximately 43-49 inches long (e.g., 45 inches) by approximately 40-46 inches wide (e.g., 45 inches) and the electrical box group 850 is approximately 14-16 inches long by approximately 20-23 inches wide by approximately 8-10 inches high. In some examples, the bulk container 852 can be approximately 32-42 inches high (e.g., 33 inches). In the illustrated example, six stacks of electrical boxes 800 are positioned in two rows of three on the platform 854. Each of the six stacks can comprise four electrical boxes 800, but in some examples, the stacks can comprise greater than or fewer than four electrical boxes. The electrical box group 850 can be a secure way to transport many electrical boxes as the electrical boxes can be mated in each stack and each stack can be in contact with other stacks, thereby creating a semi-rigid structure contained within the bulk container 852.

In similarity with FIG. 7, each of the electrical boxes 800 in the electrical box group 850 of FIG. 8 includes: (a) a lid with a lid structure comprising a lid upper surface structure and a lid lower surface structure; (b) a base with a base structure comprising a base upper surface structure that is identical to the lid upper surface structure and a base lower surface structure that is identical to the lid lower surface structure; and (c) side walls extending between the lid and the base to form an interior that houses one or more electrical components. As described elsewhere herein, an upper electrical box that is stacked on top of a lower electrical box comprises the base lower surface structure of the upper electrical box mating the lid upper surface structure of the lower electrical box.

Figure 9:
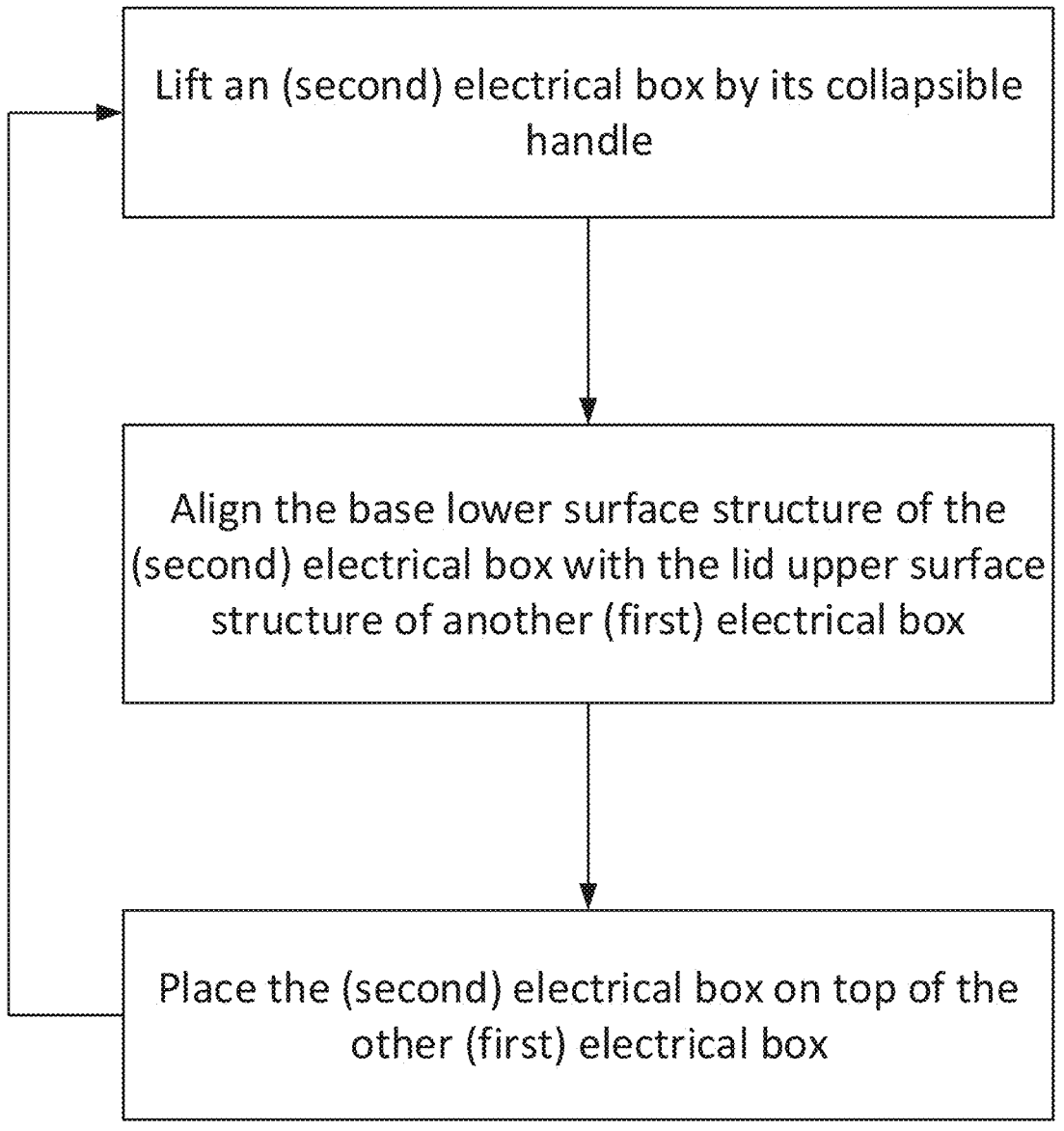
FIG. 9 is a flow chart of an example method of stacking electrical distribution boxes according to an aspect of the present disclosure.

Moving to FIG. 9, FIG. 9 is a flow chart of an example method of stacking electrical distribution boxes according to an aspect of the present disclosure. The method includes lifting an (second) electrical box by its collapsible handle, aligning the base lower surface structure of the (second) electrical box with the lid upper surface structure of another (first) electrical box, and placing the (second) electrical box on top of the other (first) electrical box. The method can then repeat any number of times with another electrical box being lifted by its collapsible handle and being placed on top of, and mated to, the top-most electrical box. In some examples, each of the lids and bases of the multiple electrical boxes are identical with one other, having the same upper surface structure and the same lower surface structure. In some examples, each of the electrical boxes contain identical electrical components. Further, in some examples, each of the electrical boxes are identical to each other.

Various examples of the disclosure have been described. Any combination of the described systems, operations, or functions is contemplated. These and other examples are within the scope of the following claims.

What is claimed is:

1. An electrical box comprising:
   (a) a lid that includes lid structure comprising a lid upper surface structure and a lid lower surface structure, the lid upper surface structure comprising a plurality of raised features and a plurality of recessed features;
   (b) a base that includes a base structure comprising a base upper surface structure and a base lower surface structure; and
   (c) side walls extending between the lid and the base to form an interior configured to house one or more electrical components,
   wherein the lid upper surface structure is configured to mate with complementary features of a lower surface structure of a higher electrical box in a stack, and the base lower surface structure is configured to mate with an upper surface structure of a lower electrical box in the stack, and
   wherein the lid upper surface structure is identical to the base upper surface structure and to the upper surface structure of the lower electrical box in the stack, and the lid lower surface structure is identical to the base lower surface structure and to the lower surface structure of the higher electrical box in the stack.

2. The electrical box of claim 1, wherein the lid structure is identical to the base structure.

3. The electrical box of claim 1, wherein the plurality of raised features and the plurality of recessed features of the lid upper surface structure comprise horizontally symmetrical raised features and recessed features.

4. The electrical box of claim 1, wherein the lid upper surface structure includes a handle.

5. The electrical box of claim 4, wherein the lid upper surface structure includes a handle depression, the handle being movable between a storage position in which the handle is nestled in the handle depression and an operational position in which the handle is withdrawn from the handle depression for use.

6. The electrical box of claim 1, wherein the side walls form a side wall perimeter, the lid has a perimeter that extends horizontally beyond the side wall perimeter, and the lid is configured to direct liquid beyond the side wall perimeter.

7. The electrical box of claim 6, wherein the lid comprises a rubber material, and the side walls comprise sheet metal having one or more cutouts formed therein for cooling purposes, the lid serving as a bumper for the side walls, the bumper being configured to minimize movement or impact damage to the electrical box.

8. The electrical box of claim 1, wherein the lid upper surface structure includes one or more sloped surfaces to direct any liquid away from a middle of the lid upper surface structure toward one or more edges of the lid upper surface structure to prevent liquid from entering the interior.

9. The electrical box of claim 8, wherein the side walls form a side wall perimeter, the side walls having one or more cutouts formed therein for cooling purposes, and the lid has a perimeter that extends horizontally beyond the side wall perimeter, and wherein the lid upper surface structure includes one or more holes to drain liquid outside the side wall perimeter.

10. A method comprising:
   stacking a second electrical box on top of a first electrical box,
      the first electrical box including a first lid that includes a first lid structure comprising a first lid upper surface structure and a first lid lower surface structure, a first base that includes a first base structure comprising a first base upper surface structure and a first base lower surface structure, and first side walls extending between the first lid and the first base to form a first interior that houses a first set of electrical components, and the second electrical box including a second lid that includes a second lid structure comprising a second lid upper surface structure and a second lid lower surface structure, a second base that includes a second base structure comprising a second base upper surface structure and a second base lower surface structure, and second side walls extending between the second lid and the second base to form a second interior that houses a second set of electrical components, wherein the first lid upper surface structure comprises a plurality of raised features and a plurality of recessed features that mate with complementary features of the second base lower surface structure, wherein the first base upper surface structure, the first lid upper surface structure, the second base upper surface structure, and the second lid upper surface structure are identical to one another, and wherein the first base lower surface structure, the first lid lower surface structure, the second base lower surface structure, and the second lid lower surface structure are identical to one another.

11. The method of claim 10, wherein the first lid structure, the first base structure, the second lid structure, and the second base structure are identical to one another.

12. The method of claim 10, wherein stacking the second electrical box on top of the first electrical box comprises lifting the second electrical box with a second collapsible handle and placing the second electrical box on top of the first electrical box to mate the second base lower surface structure with the first lid upper surface structure.

13. The method of claim 10, further comprising stacking a third electrical box on top of the second electrical box, the third electrical box including a third lid that includes a third lid structure comprising a third lid upper surface structure and a third lid lower surface structure, a third base that includes a third base structure comprising a third base upper surface structure and a third base lower surface structure, and third side walls extending between the third lid and the third base to form a third interior that houses a third set of electrical components, wherein the second lid upper surface structure comprises a second plurality of raised features and a second plurality of recessed features that mate with complementary features of the third base lower surface structure, wherein the second lid upper surface structure, the third base upper surface structure, and the third lid upper surface structure are identical to one another, and wherein the second lid lower surface structure, the third base lower surface structure, and the third lid lower surface structure are identical to one another.

14. The method of claim 10, wherein the first set of electrical components is identical to the second set of electrical components.

15. The method of claim 10, wherein:

the first side walls comprise sheet metal and form a first side wall perimeter, the first lid comprises a rubber material and has a first lid perimeter that extends horizontally beyond the first side wall perimeter, the second side walls comprise sheet metal and form a second side wall perimeter, the second lid comprises the rubber material and has a second lid perimeter that extends horizontally beyond the second side wall perimeter, the first lid serves as a first bumper for the first side walls, and the second lid serves as a second bumper for the second side walls.

16. The method of claim 10, wherein the second lid upper surface structure includes one or more sloped surfaces to direct any liquid away from a middle of the second lid upper surface structure toward one or more edges of the second lid upper surface structure to prevent liquid from entering the second interior.

17. The method of claim 16, wherein the second side walls form a second side wall perimeter, and the second lid has a perimeter that extends horizontally beyond the second side wall perimeter, and wherein the second lid upper surface structure includes one or more holes to drain liquid outside the second side wall perimeter.

18. An electrical box group comprising:

a bulk container that includes a platform; and six stacks of electrical boxes positioned in two rows of three on the platform, each electrical box in each of the six stacks of electrical boxes including (a) a lid that includes lid structure comprising a lid upper surface structure and a lid lower surface structure, (b) a base that includes a base structure comprising a base upper surface structure that is identical to the lid upper surface structure and a base lower surface structure that is identical to the lid lower surface structure, and (c) side walls extending between the lid and the base to form an interior that houses one or more electrical components, wherein, in each of the six stacks of electrical boxes, an upper electrical box being stacked on top of a lower electrical box comprises a plurality of raised features and a plurality of recessed features of the base lower surface structure of the upper electrical box mating with complementary features of the lid upper surface structure of the lower electrical box.

19. The electrical box group of claim 18, wherein each of the six stacks of electrical boxes comprises four electrical boxes.

20. The electrical box group of claim 18, wherein the platform is approximately 43-49 inches long and approximately 40-46 inches wide centimeters wide.

* * * * *